US008523726B2

(12) United States Patent
Giessner

(10) Patent No.: US 8,523,726 B2
(45) Date of Patent: Sep. 3, 2013

(54) HYBRID DRIVE FOR A MOTOR VEHICLE

(75) Inventor: Andreas Sylvester Giessner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 29 days.

(21) Appl. No.: 13/147,875

(22) PCT Filed: Jan. 22, 2010

(86) PCT No.: PCT/EP2010/050711
§ 371 (c)(1),
(2), (4) Date: Aug. 4, 2011

(87) PCT Pub. No.: WO2010/094530
PCT Pub. Date: Aug. 26, 2010

(65) Prior Publication Data
US 2011/0290071 A1 Dec. 1, 2011

(30) Foreign Application Priority Data
Feb. 17, 2009 (DE) .................... 10 2009 000 915

(51) Int. Cl.
*F16H 57/04* (2010.01)
(52) U.S. Cl.
USPC ...................................................... 475/159
(58) Field of Classification Search
USPC ............... 475/159; 74/467, 468; 184/6.12; 384/126
See application file for complete search history.

(56) References Cited

U.S. PATENT DOCUMENTS

| 2,966,078 | A | * | 12/1960 | Wright ........................... 475/149 |
| 3,770,074 | A | * | 11/1973 | Sherman ....................... 180/65.6 |
| 3,812,928 | A | * | 5/1974 | Rockwell et al. ........... 180/65.51 |
| 4,779,165 | A | * | 10/1988 | Elsaesser et al. ............ 360/99.18 |
| 4,825,720 | A | | 5/1989 | Capdepuy |
| 5,626,345 | A | * | 5/1997 | Wallace ......................... 277/309 |
| 6,373,158 | B1 | * | 4/2002 | Hsu et al. ......................... 310/90 |
| 6,428,442 | B1 | * | 8/2002 | Turgay et al. .................. 475/321 |
| 7,090,607 | B2 | | 8/2006 | Yamauchi et al. |
| 7,944,106 | B2 | | 5/2011 | Miller et al. |
| 8,267,223 | B2 | * | 9/2012 | Ideshio et al. ...................... 184/6 |
| 2006/0166778 | A1 | * | 7/2006 | Tabata et al. .................. 475/159 |
| 2009/0098969 | A1 | | 4/2009 | Tabata et al. |

(Continued)

FOREIGN PATENT DOCUMENTS

DE 69 38 461 U 1/1970
DE 41 08 647 A1 9/1992

(Continued)

*Primary Examiner* — Justin Holmes
*Assistant Examiner* — Stacey Fluhart
(74) *Attorney, Agent, or Firm* — Davis & Bujold, PLLC

(57) ABSTRACT

A hybrid drive for a motor vehicle which has a combustion engine, a transmission with a transmission input shaft which can be coupled with the combustion engine, and an electric machine which is positioned between the combustion engine and the transmission. The electric machine has a stator and a rotor which interacts with the transmission input shaft and is supported by a transmission housing input part. The transmission input shaft is supported, by a fixed radial bearing and a spaced radial bearing, in a bearing journal of the transmission housing input part. The rotor is connected, in a rotationally fixed manner, to an extension of the transmission input shaft which protrudes from a bearing journal. A radial shaft seal is positioned at the end of the bearing journal, facing the rotor, and the two radial bearings are cooled and lubricated by transmission oil.

12 Claims, 2 Drawing Sheets

(56) References Cited

U.S. PATENT DOCUMENTS

| | | | |
|---|---|---|---|
| 2009/0212503 A1* | 8/2009 | Huang | 277/513 |
| 2009/0233749 A1* | 9/2009 | Tomita et al. | 475/159 |
| 2011/0103731 A1* | 5/2011 | Fahrni et al. | 384/572 |

FOREIGN PATENT DOCUMENTS

| | | |
|---|---|---|
| DE | 199 08 158 A1 | 8/2000 |
| DE | 100 49 197 A1 | 4/2002 |
| DE | 102 46 839 A1 | 4/2004 |
| DE | 60 2004 004 932 T2 | 6/2007 |
| DE | 10 2006 003 213 A1 | 7/2007 |
| DE | 10 2006 040 117 A1 | 3/2008 |
| DE | 10 2007 054 355 A1 | 5/2008 |
| DE | 10 2007 024 126 A1 | 12/2008 |
| EP | 0 250 283 A1 | 12/1987 |
| EP | 1 544 510 A2 | 6/2005 |
| EP | 1 900 564 A1 | 3/2008 |

\* cited by examiner

HYBRID DRIVE FOR A MOTOR VEHICLE

This application is a National Stage completion of PCT/EP2010/050711 dated Jan. 22, 2010, which claims priority from German patent application serial no. 10 2009 000 915.9 filed Feb. 17, 2009.

FIELD OF THE INVENTION

The invention relates to a hybrid drive for a motor vehicle, with a combustion engine, with a manual transmission which has a transmission input shaft that can be coupled with the combustion engine, and positioned between the combustion engine and the manual transmission is an electric machine having a stator and a rotor which interacts with the transmission input shaft and is rotatably supported in a transmission housing input section.

BACKGROUND OF THE INVENTION

Such a hybrid drive is described in DE 60 2004 004 932 T2. The hybrid drive comprises a combustion engine and two electric machines. It teaches a gear mechanism with two planetary gear sets, in which a ring gear of the first planetary gear set is connected with a planetary carrier of the second planetary gear set, and a sun gear of the second planetary gear set is in drive connection with one of the electric machines, while a sun gear of the first planetary gear set is in drive connection with the second electric machine. A transmission input shaft, which is in drive connection with the combustion engine via a shiftable clutch, is connected with a planetary carrier of the first planetary gear set which forms at the same time a ring gear for the second planetary gear set. The axes of the electric machines are positioned in parallel to each other, whereby the first electric machine is positioned parallel to and at a distance from the axis of the two planetary gear wheels sets and is connected with them by means of a gear set, while the second electric machine is coaxially positioned with the two planetary gear sets and where its rotor is embedded on the one hand in a transmission housing input section of the gear mechanism and is linked on the other hand to the transmission input shaft which is driven by the combustion engine.

SUMMARY OF THE INVENTION

It is the task of the invention to propose a simple possibility for an integration of an electric machine with a transmission, especially with an automatic or semiautomatic transmission, which features a simple construction and an extended bearing service life.

This task is solved, in accordance with the invention, for a hybrid drive of a motor vehicle which has a combustion engine, with a transmission having a transmission input shaft which can be coupled to the combustion engine, and with an electric machine which is positioned between the combustion engine and the transmission, where the electric machine has a stator and a rotor which interacts with the transmission input shaft and is rotatably supported by an input section of a transmission housing, so that the transmission input shaft is positioned in an axle journal of the input section of the transmission housing by means of a fixed radial bearing and a spaced gliding radial bearing, the is rotor connected in a rotationally fixed manner, by way of an extension of the transmission shaft which protrudes out of the axle journal, with a radial shaft seal which is positioned at the end of the axle journal facing the rotor, and the two radial bearings are lubricated and cooled by the transmission oil.

The inventive hybrid drive relates to a parallel one-clutch system in which the construction of the transmission is, in itself, irrelevant and may be especially a semiautomatic or automatic transmission and its transmission input shaft is connected in a rotationally fixed manner with the rotor of the electric machine, and just the combustion engine can be selectively coupled with the transmission.

The design in accordance with the invention enables lubrication and cooling of the named radial bearings with transmission oil, thus achieving an increase of the service life of the bearing as compared to the known bearing arrangements of radial bearings on each side of the rotor of the electric machine, because direct lubrication in these known bearing arrangements of the bearing facing away from the transmission, is not possible by means of the transmission oil.

In particular, the rotor can be attached to a rotor carrier, were its hub is connected with the named extension of the transmission input shaft via a form-fit connection, so that the radial shaft seal can provide a gliding seal in reference to the hub.

If the transmission input shaft is designed as a hollow shaft, a drive shaft can be arranged within the hollow shaft and can be connected with it in a rotationally fixed manner via a form-fit connection. In this case, the drive shaft provides the connection to the combustion engine. However, a one-piece drive transmission input shaft can also be provided.

Centering of the drive shaft can, on the one hand, take place in reference to the transmission input shaft by means of a centering collar, where there is also a seal provided by means of an O-ring seal, and the axial positioning takes place by means of a safety-lock ring, while the opposite end of the drive shaft is provided in a pilot bearing, in a flywheel of the combustion engine.

Centering of the hub of the rotor carrier can be performed in a way that the hub has, adjacent the form-fit connection with the extension of the transmission input shaft, a cylindrical area which together with a corresponding cylindrical area at the transmission input shaft forms a center-fit, whereby sealing in this area is performed by an O-ring seal.

BRIEF DESCRIPTION OF THE DRAWINGS

The invention is further explained in the following, based on the embodiment example shown in the drawing. The drawing shows FIG. 1 a schematic cross sectional view of a hybrid drive for a motor vehicle, and FIG. 2 an enlarged detailed view of the connection between the rotor carrier and the transmission input shaft of the hybrid drive in accordance with FIG. 1.

DETAILED DESCRIPTION OF THE PREFERRED EMBODIMENTS

Figure 1:
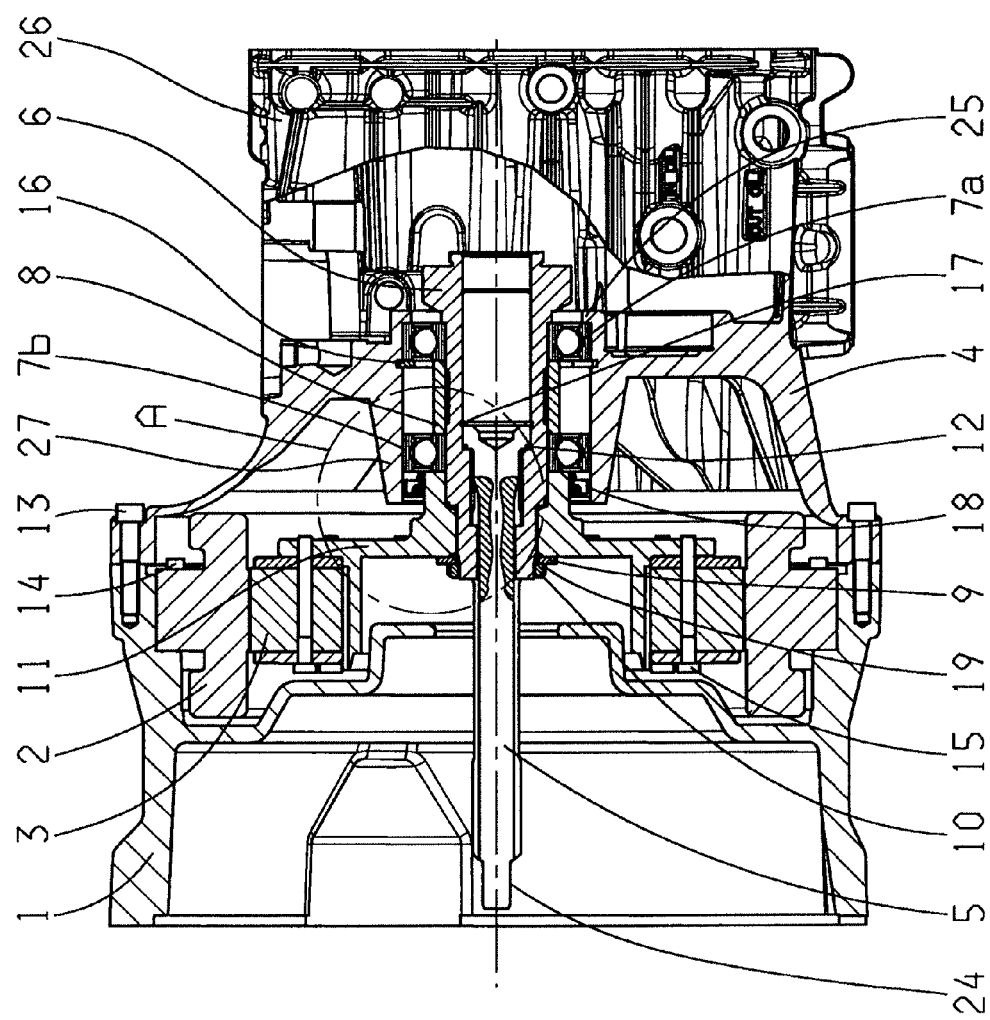
Figure 2:
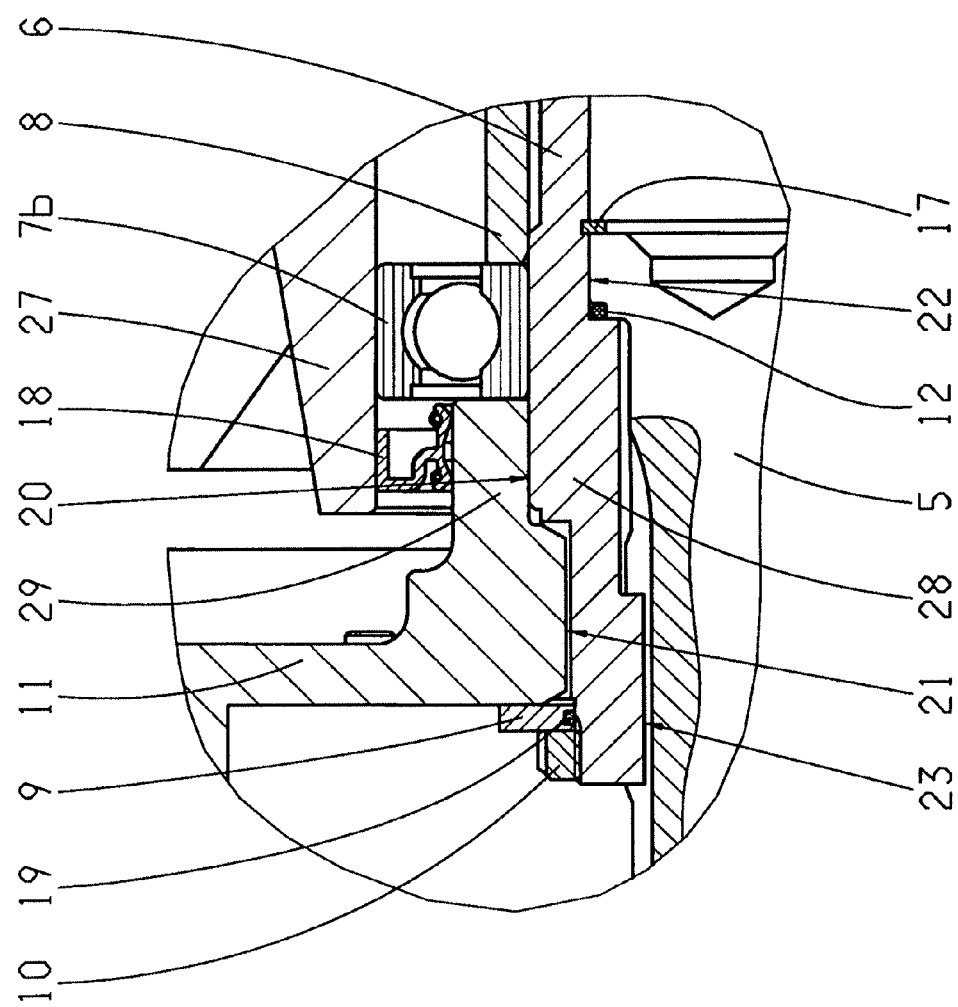

The hybrid drive housing 1 can be connected to a combustion engine 1 (not shown), which can be coupled, via a flywheel (not shown), with the drive shaft 5, whereby a transmission external bearing seat 24 is positioned along the drive shaft in the pilot bearing of the flywheel, which is for instance designed as a dual mass flywheel.

In the hybrid drive housing 1, an electric machine with a stator 2 and a rotor 3 is positioned, which can be operated as a generator or as an electric engine. The stator 2 is connected with the hybrid drive housing 1 by means of the bolts 14. A transmission input housing 4, with its outer, conical geometry, of a transmission 26 is screwed to the hybrid drive housing 1 by means of bolts 13. The transmission input housing 4 has a radially inner axle journal 27 which extends axially and is used to support a transmission input shaft 6 by means of a fixed radial bearing 7a and by means of a loose radial bearing 7b which is kept at distance by means of a sleeve 8.

The fixed radial bearing 7a is axially secured in the axle journal 27 by means of a circlip 16. An extension 28 of the transmission input shaft 6 which extends beyond the loose radial bearing 7b has a radial, outer spline shaft profile 21 which forms with a corresponding radial, inner spline shaft profile in a hub 29 of a rotor carrier 11, a form-fit connection between the rotor 3 and the transmission input shaft 6. A cylindrical area, adjacent the spline shaft profile 21 in the hub 29, forms a centering collar 20 with a corresponding cylindrical area at the transmission input shaft 6.

The rotor carrier 11 is axially secured, in reference to the transmission input shaft 6, in a way that a predetermined, axial preload force, for instance by means of a slotted nut 10 and a washer 9, is applied to the inner ring of the loose radial bearing 7b and, via the sleeve 8, to the inner ring of the fixed radial bearing 7a, wherein the inner ring of the fixed radial bearing 7a is braced by a shoulder 25 of the transmission input shaft 6.

The transmission input shaft 6 is designed in this embodiment as a hollow shaft in which the drive shaft 5 is coaxially positioned and is connected in a rotationally fixed manner to the transmission input shaft 6 with a form-fit connection by means of a spline shaft profile 23. The drive shaft 5 has a centering collar 22 which is, in reference to the transmission input shaft 6, sealed by means of an O-ring seal 12 and which is axially fixed in position by a circlip 17. In an additional embodiment (not shown), a one-part transmission drive input shaft can be provided as an alternative.

The rotor 3 of the electric machine is connected with the rotor carrier 11 by means of bolts 15.

To prevent oil from leaking from the transmission 26, via the bearings 7a and 7b, into the hybrid drive housing 1, a radial shaft seal 18 is positioned at the axle journal 27 which forms a rotation seal in reference to the hub 29 of the rotor carrier 11. Additionally, static seals are provided between the transmission input shaft 6 and the drive shaft 5, in the area of the centering collar 22, and designed as a O-ring seal 12 and between the hub 29 of the rotor carrier 11, and the transmission input shaft 6, designed as an O-ring seal 19 in the area of the washer 9.

The rotor carrier 11 forms, together with the transmission input shaft 6, a support bearing in the axle journal 27 which is, in reference to the electric machine 2, 3, in an axial offset integrated into the transmission housing input parts 4, whereby it is possible to lubricate and to cool the two radial bearings 7a and 7b by means of the transmission oil, to increase the service life of the bearing.

REFERENCE CHARACTERS

1 Hybrid Drive Housing
2 Stator of an Electric Machine
3 Rotor of an Electric Machine
4 Transmission Housing Input Part
5 Drive Shaft
6 Transmission Input Shaft
7a Fixed Radial Bearing
7b Loose Radial Bearing
8 Sleeve
9 Washer
10 Slotted Nut
11 Rotor Carrier
12 O-Ring Seal
13 Bolt
14 Bolt
15 Bolt
16 Circlip
17 Circlip
18 Radial Shaft Seal Ring
19 O-Ring Seal
20 Centering Collar
21 Form-Fit Connection (Spline Shaft Profile)
22 Centering Collar
23 Form-Fit Connection (Spline Shaft Profile)
24 Bearing Seat
25 Recess
26 Transmission
27 Axle journal
28 Extension
29 Hub

The invention claimed is:

1. A hybrid drive for a motor vehicle comprising:
a combustion engine;
a transmission (26) having a transmission input shaft (6) being connectable with the combustion engine;
an electric machine being positioned between the combustion engine and the transmission (26), and the electric machine having a stator (2) and a rotor (3) which interact with the transmission input shaft (6) and which is also rotatably supported within a transmission enclosure input part (4);
the transmission input shaft (6) being supported by a bearing journal (27) of the transmission housing input part (4) via a fixed radial bearing (7a) and a spaced loose radial bearing (7b);
the rotor (3) being connected, in a rotationally fixed manner, via a rotor carrier (11) to an extension (28) of the transmission input shaft (6) protruding from the bearing journal (27); and
a radial shaft seal (18) being positioned at an end of the bearing journal (27), facing the rotor (3), and forming a seal between the bearing journal (27) and the rotor carrier (11) so that the rotor (3) in the hybrid drive housing (1) is sealed with respect to and separated from transmission oil lubricating and cooling the fixed and the loose radial bearings (7a, 7b);
wherein a bearing circlip (16) axially fixes the fixed radial bearing (7a) to the bearing journal (27), and only the circlip (16) is axially located between an outer ring of the fixed radial bearing (7a) and an outer ring of the loose radial bearing (7b).

2. The hybrid drive according to claim 1, wherein the rotor (3) is mounted to the rotor carrier (11) and a hub (29) of the rotor carrier (11) is connected, by a form-fit connection (21), with the extension (28) of the transmission input shaft (6).

3. The hybrid drive according to claim 2, wherein the radial shaft seal (18) forms a loose seal with respect to the hub (29).

4. The hybrid drive according to claim 2, wherein the hub (29) of the rotor carrier (11), which is adjacent to the form-fit connection (21), has a cylindrical area which forms a centering collar (20) with a corresponding area at the transmission input shaft (6).

5. The hybrid drive according to claim 4, wherein the hub (29) of the rotor carrier (11), with reference to the extension (28) at the transmission input shaft (6), is sealed by an O-ring seal (19).

6. The hybrid drive according to claim 1, wherein the transmission input shaft (6) is a hollow shaft in which a drive shaft (5) is partially received, and the drive shaft (5) is connected, in a rotationally fixed manner, with the transmission input shaft (6) by a form-fit connection (23).

7. The hybrid drive according to claim 6, wherein the drive shaft (5) has a centering collar (22) which is sealed, by an O-ring seal (12), with respect to the transmission input shaft (6) and is axially secured to the transmission input shaft (6) by a shaft circlip (17).

8. The hybrid drive train according to claim 1, wherein the transmission input shaft (6) comprises a one-part drive-transmission input shaft.

9. The hybrid drive according to claim 1, wherein a sleeve (8) is located between and spaces the fixed radial bearing (7a) from the loose radial bearing (7b).

10. The hybrid drive according to claim 9, wherein the sleeve (8) is located directly adjacent to an inner ring of the fixed radial bearing (7a), an inner ring of the loose radial bearing (7b) and an exterior surface of the transmission input shaft (6).

11. The hybrid drive according to claim 1, wherein a radially inner surface of the bearing journal (27) engages with an outer ring of both the fixed radial bearing (7a) and the loose radial bearing (7b).

12. The hybrid drive according to claim 1, wherein only a sleeve (8) is axially located between an inner ring of the fixed radial bearing (7a) and an inner ring of the loose radial bearing (7b).

* * * * *